(12) United States Patent
Trabelsi et al.

(10) Patent No.: US 11,481,501 B2
(45) Date of Patent: Oct. 25, 2022

(54) LOW FALSE POSITIVE TOKEN IDENTIFICATION IN SOURCE CODE REPOSITORIES USING MACHINE LEARNING

(71) Applicant: SAP SE, Walldorf (DE)

(72) Inventors: Slim Trabelsi, Biot (FR); Sofiane Lounici, Le Cannet (FR); Marco Rosa, Biot (FR); Carlo Maria Negri, Antibes (FR)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 16/778,872

(22) Filed: Jan. 31, 2020

(65) Prior Publication Data

US 2021/0240834 A1    Aug. 5, 2021

(51) Int. Cl.
*G06F 21/57* (2013.01)
*G06N 3/08* (2006.01)
*G06N 20/10* (2019.01)
*G06N 20/20* (2019.01)

(52) U.S. Cl.
CPC .............. *G06F 21/577* (2013.01); *G06N 3/08* (2013.01); *G06N 20/10* (2019.01); *G06N 20/20* (2019.01); *G06F 2221/033* (2013.01)

(58) Field of Classification Search
CPC ..... G06F 21/577; G06F 2221/033; G06N 3/08; G06N 20/10; G06N 20/20
See application file for complete search history.

(56) References Cited

U.S. PATENT DOCUMENTS

| | | | |
|---|---|---|---|
| 9,021,135 B2 * | 4/2015 | Ang | H04L 63/0815 725/109 |
| 9,465,942 B1 * | 10/2016 | Kane-Parry | G06F 21/57 |
| 9,648,011 B1 * | 5/2017 | Mattsson | H04L 9/3226 |
| 9,813,450 B1 * | 11/2017 | Wasiq | H04L 63/20 |
| 10,862,880 B1 * | 12/2020 | Massicotte | H04L 63/1466 |
| 2019/0171846 A1 * | 6/2019 | Conikee | G06F 21/577 |

* cited by examiner

*Primary Examiner* — Khoi V Le
(74) *Attorney, Agent, or Firm* — Schwegman Lundberg & Woessner, P.A.

(57) ABSTRACT

Source code is scanned to generate a list of vulnerable tokens. Thereafter, the list of vulnerable tokens is inputted into a machine learning model to identify false positives in the list of vulnerable tokens. Based on this identification, the list of vulnerable tokens can be modified to remove the identified false positives. Related apparatus, systems, techniques and articles are also described.

20 Claims, 4 Drawing Sheets

LOW FALSE POSITIVE TOKEN IDENTIFICATION IN SOURCE CODE REPOSITORIES USING MACHINE LEARNING

TECHNICAL FIELD

The subject matter described herein relates to enhanced techniques for identifying potentially vulnerable tokens within source code repositories using machine learning.

BACKGROUND

Source code repositories, which host open source code and files for reuse by the public, are increasingly being utilized by vast numbers of users. Given the large number of software developers contributing code to such repositories, issues can arise in which sensitive information is inadvertently uploaded and made available to the public. Hardcoded tokens in source code uploaded to such repositories are easily exploited making them a well-known vulnerability. To address such vulnerabilities, some source code repositories employ scanners to identify hardcoded tokens and the characterize such tokens using a rules-based approach. However, such scanners often mischaracterize identified hardcoded tokens as comprising sensitive information. As one example, a software developer may include dummy credentials for testing purposes which, when reused by another software developer, would obviously be replaced with actual credentials.

SUMMARY

In a first aspect, source code is scanned to generate a list of vulnerable tokens. Thereafter, the list of vulnerable tokens is inputted into a machine learning model to identify false positives in the list of vulnerable tokens. Based on this identification, the list of vulnerable tokens can be modified to remove the identified false positives.

The scanning can occur at different points including one or more of: prior to uploading of the source code to a source code repository, prior to publishing of the source code on a source code repository (e.g., a publically available source code repository), and/or on a periodic basis (especially with regard to widely used public source code repositories).

The machine learning model can take various forms including one or more of: a logistic regression model, a neural network, a Random Forest, a support vector machine, or a text classification and representation learning model.

The modified list of vulnerable tokens can be rendered in a graphical user interface as a list of entries with corresponding graphical user interface elements. With such an arrangement, user-generated input can be received selecting at least one of the graphical user interfaces to modify at least one entry in the list of vulnerable tokens.

The modified list can be provided by one or more of: transmitting the modified list of vulnerable tokens to a remote computing device, providing the modified list of vulnerable tokens to a code scanner scanning the source code, loading the modified list of vulnerable tokens in memory, or storing the modified list of vulnerable tokens in physical persistence.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for scanning source code repositories to identify problematic tokens with low false positive rates. In addition, the current subject matter is advantageous in that it can be used to check code during a development stage prior to it being committed to a source code repository.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
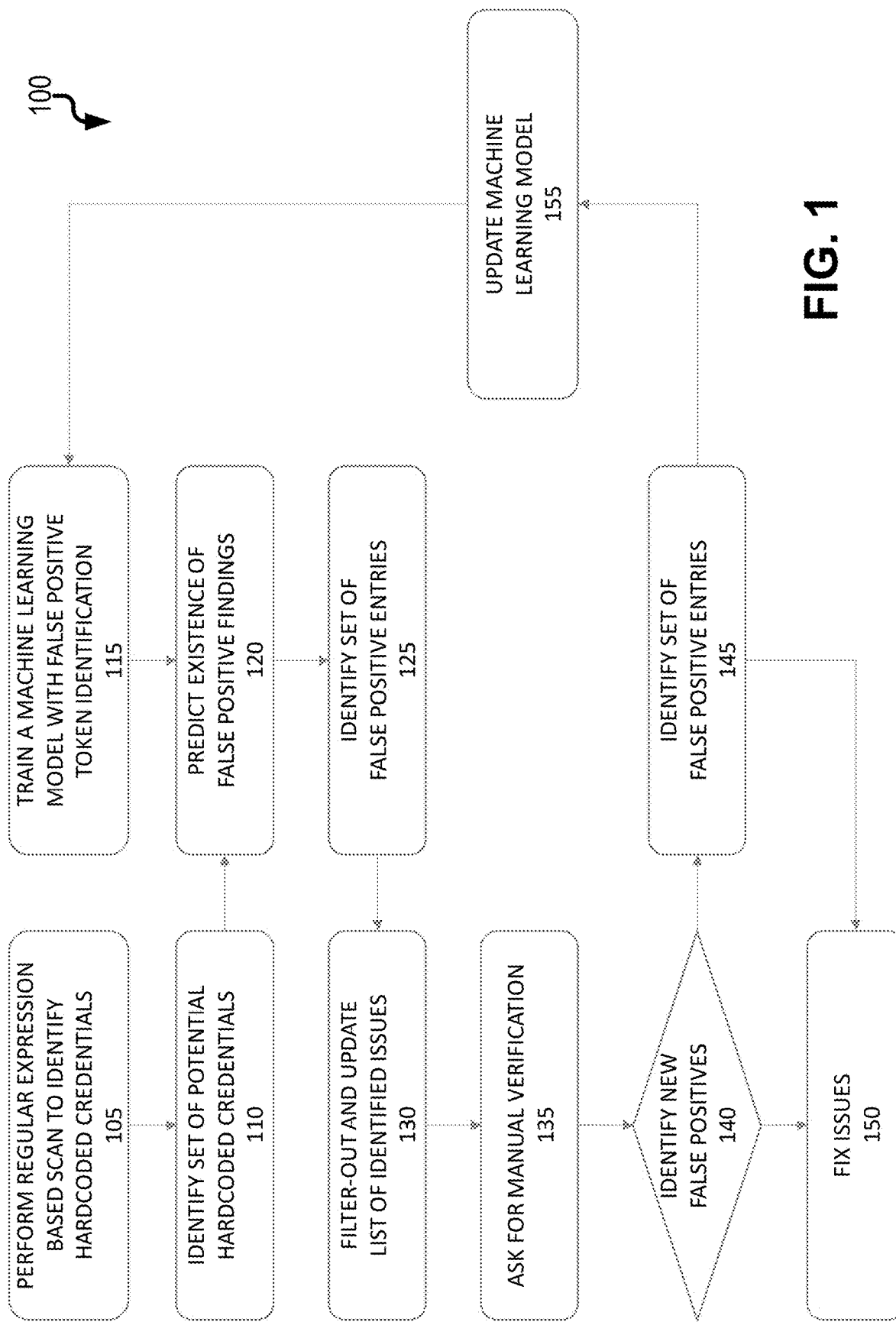
FIG. 1 is a first process flow diagram illustrating low false positive token identification in source code repositories using machine learning.

The inclusion of hardcoded security tokens within software source code is one of the most frequent mistakes committed by non-expert software developers. The NIST standard defined this weakness as "The software contains hard-coded credentials, such as a password or cryptographic key, which it uses for its own inbound authentication, outbound communication to external components, or encryption of internal data". This mistake opens the floor to very severe vulnerabilities that can be easily exploited by attackers as evidenced by numerous historical attacks that have used such exploit. The attacker model is simple: the attacker scans public source code repositories to find tokens encapsulating exploitable hardcoded credentials (passwords, tokens, private keys, etc.). Once the tokens are identified, the attacker can use the credentials contained therein to access cloud APIs or access on premise systems running the vulnerable code.

Despite the severity of the threat emanating from this vulnerability, very few code scanners (i.e., software tools to scan software contained within a source code repository and/or to scan code prior to it being uploaded to or published by a source code repository, etc.) include features to check the existence of tokens in the source code. Some open source solutions are proposing a script based approach based on regular expression execution (i.e. a rules-based approach to identify hardcoded security tokens, etc.) to identify declaration of credentials. This approach is efficient to identify the existence of hardcoded credentials but is problematic in that a rules-based approach introduces a very high rate of false positives (e.g., some systems have as false positive rate as high as 80%). These false positives result from the lack of precision and granularity of the regular expression definition.

As used herein, a false positive is when a token present in source code is correctly defined but identified as non-protected, or when the token is fake and used for testing purposes and identified as a real one. The occurrence of false positives in the scans start to be problematic when huge source code projects are scanned, and the generated alerts are counted by thousands requiring significant manual review.

According to observations, almost 50% of the false positives identified by conventional code scanners are dummy data mainly used for code testing purpose. These elements can be identified by analyzing the source file path or file name. Usually an indication about the testing purpose of a source code can be captured from the file name or the path. Almost 10% of the false positive concern documentation files. The documentation contains fake tokens to explain how the application is consuming tokens for security purpose. The rest of the false positives mainly relate to misinterpretation of correct token declarations.

In order to reduce the false positive ratio, the current subject matter utilizes machine learning algorithms to automate the recognition of false positive elements within hardcoded security tokens such as path elements, documentation, correct coding conventions, etc. In particular, with the current subject matter, a machine learning model is trained to identify (i.e., classify, etc.) these patterns related to false positives cases so that those tokens classified as being non-relevant can be filtered out of a list of identified security issues. In some variations, in order to enhance the knowledge and the prediction precision rate, a permanent supervised training for the machine learning model can be used. Such a model can be constantly re-trained/updated/adapted with new forms of false positives manually identified in the source code.

As an example, software company ACME decides to make their source code publicly available to the community (open sourcing) with the objective to take benefit from the input of the external community and accelerate the adoption of their solutions. ACME has chosen to use a public repository platform such as GITHUB to publish their source code. A sanitization process is required to clean up the code and reduce the vulnerability exposure of their software. Several security code scanner tools must be used to the perform this sanitization. Checking for hardcoded tokens is one mandatory task to achieve before the publication of the source code. After using some scanning tools they obtained thousands of alerts and issues to fix. Most of these alerts are not relevant, but the developers team need to handle it one by one.

Example of false positive case identified by the scanner as true positive:
Path=/src/test/test.code
. . .
//access to the database
url="myDB/db";
login="user";
password="fakepass";

Processing such content represents a waste of time, resources and money. Especially, given that ACME is planning to set a new policy to their developers to perform such scan before any publication on GITHUB. In the short and long term this task will generate an overhead and a waste of time and resources (e.g., computing resources such as processor consumption, I/O, memory consumption, etc.).

The machine learning model can identify patterns in the code that will indicate on the presence of false positive like what is highlighted in underlining and bold below:
Path=/src/test/test.code FIG. 1 is a process flow diagram 100 illustrating low false positive token identification in source code repositories using machine learning. Initially, at 105, an expression-based scan of source code is conducted to identify hardcoded credentials within such code. The scan can take place at various points including when the source code is being uploaded to a source code repository, when the source code is received by the source code repository, when the source code is about to be published by the source code repository and/or when the source code is attempted to be downloaded by a third party. The result of such scan is, at 110, a set of potential hardcoded credentials. This list can also include information such as file name, path, code snippet where the token is identified, and the like. Some or all of this set of credentials is then inputted (in some cases after features are extracted and vectorized), at 120, into a machine learning model (which was trained, at 115, using historical data to identify the false positive tokens) to predict the existence of false positives within the set of potential hardcoded credentials to result, at 125, a set of false positive entries. Using the set of false positive entries, at 130, the list of issues identified by the scan can be updated to remove these false positives. In some variations, at 135, the list of issues can be presented to a user for manual verification (i.e., displayed in a graphical user interface allowing the user to confirm or reject any of the identified issues as being problematic). The user, can for example, at 140, identify new false positives to result in a list of new false positive entries (at 145). Further, in some variations, at 150, remedial action can be taken with regard to the issues in the list of false positive entries. Moreover, the incorrectly classified entries can be inputted, at 155, to update the machine learning model (i.e., the incorrectly classified entries can form additional training data for the machine learning model).

Figure 2:
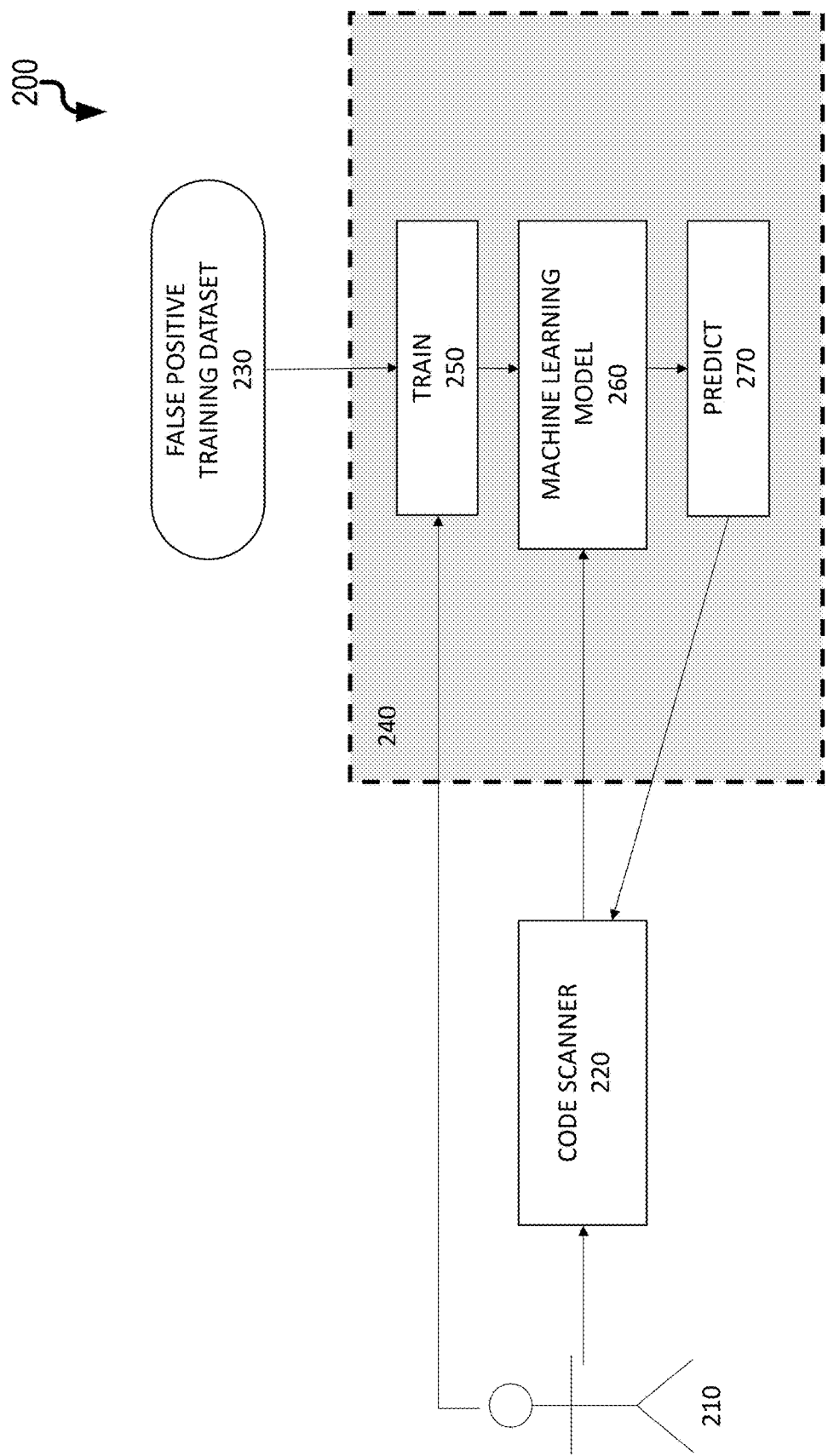
FIG. 2 is a diagram illustrating an example architecture for low false positive token identification in source code repositories using machine learning.

FIG. 2 is a diagram 200 of an architecture for low false positive token identification in source code repositories using machine learning. With this arrangement, a user 210 may initiate a code scan using a code scanner 220. The code scanner 220 can generate a list of entries which, in turn, can be analyzed by a false positive analyzer 240 to cull or otherwise remove false positives. While the false positive analyzer 240 is indicated as being separate and remote from the code scanner 220 (i.e., being executed by a remote computing system distinct from the computing system on which the code scanner 220 is executing), it will be appreciated that the false positive analyzer 240 can form part of the code scanner 220. The false positive analyzer 240 can execute a machine learning model 260 to predict false positives 270 which is then fed back to the code scanner 220. The machine learning model 260 can be trained (250) using a false positive training dataset 230. Such a training dataset 230 can, for example, be manually annotated tokens (e.g., fake tokens, documentation, correctly defined tokens, etc.)

in which a code scanner and/or a human analyzer classifies such token as vulnerable or safe.

Figure 3:
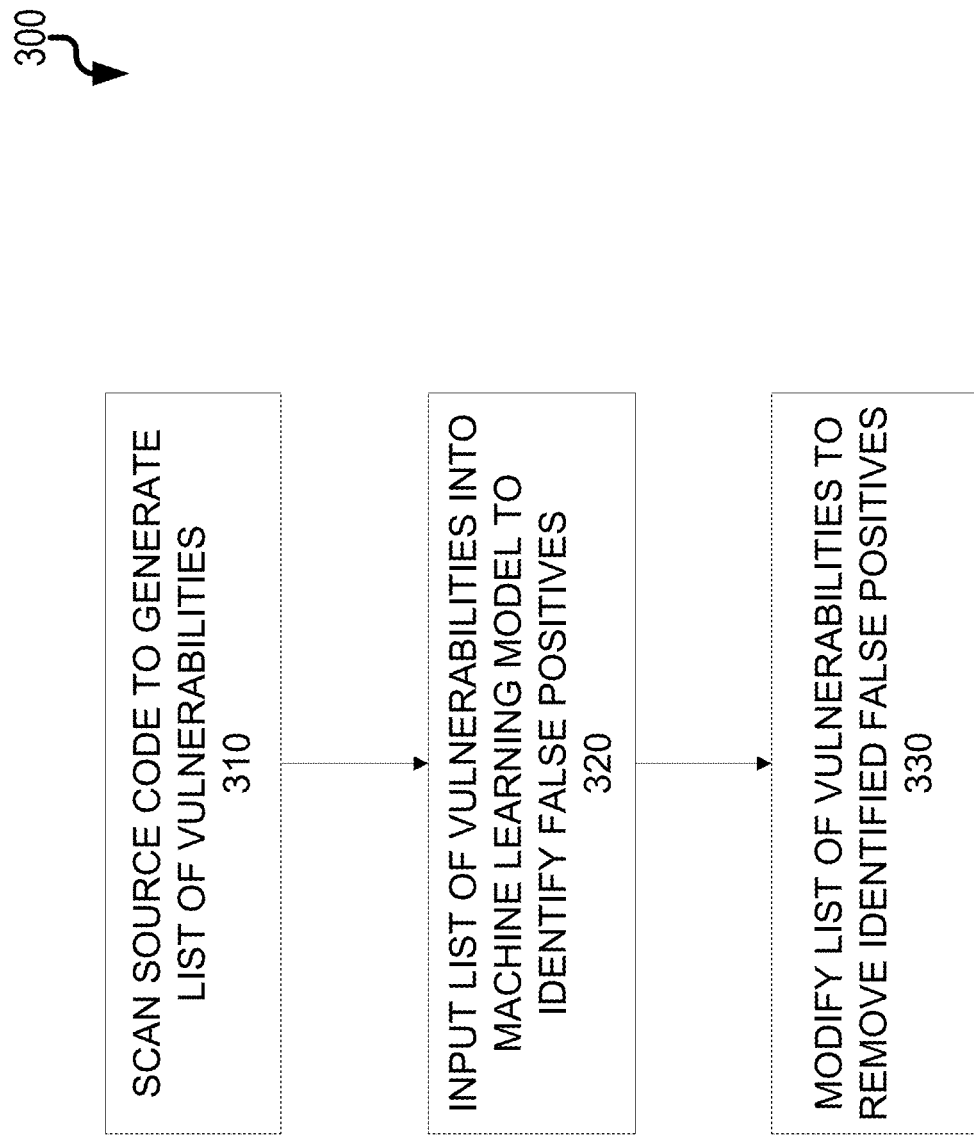
FIG. 3 is a second process flow diagram illustrating low false positive token identification in source code repositories using machine learning.

FIG. 3 is a process flow diagram 300 illustrating low false positive token identification in source code repositories using machine learning. Initially, at 310, source code is scanned to generate a list of vulnerable tokens. Next, at 320, the list of vulnerable tokens is inputted into a machine learning model to identify false positives in the list of vulnerable tokens. Subsequently, at 330, the list of vulnerable tokens is modified to remove the identified false positives.

Figure 4:
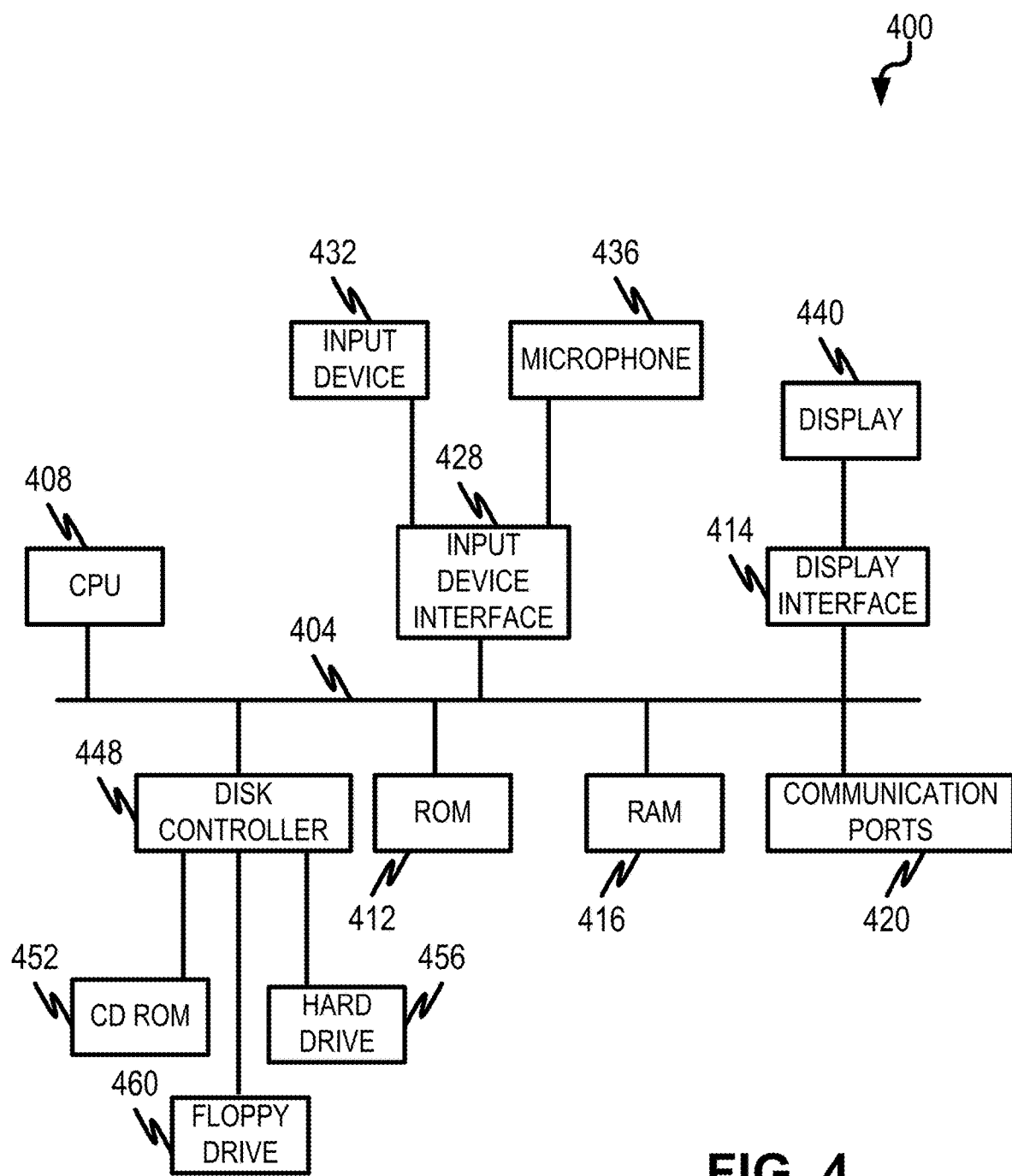
FIG. 4 is a diagram illustrating a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
accessing historical data comprising source code tokens that a rules-based algorithm has identified as vulnerable;
classifying the source code tokens in the historical data as vulnerable or safe;
forming a false positive training dataset including source code tokens from the historical data that have been classified as safe;
training a machine learning model using the false positive training dataset;
scanning source code to generate a list of vulnerable tokens;
inputting, the list of vulnerable tokens, into the machine learning model to identify false positives in the list of vulnerable tokens;
modifying the list of vulnerable tokens to remove the identified false positives; and
causing modification of at least one of the vulnerable tokens, from the modified list of vulnerable tokens, in the source code thereby reducing false positives in identification of source code tokens.

2. The method of claim 1, wherein the scanning occurs prior to uploading of the source code to a source code repository.

3. The method of claim 1, wherein the scanning occurs prior to publishing of the source code on a source code repository.

4. The method of claim 1, wherein the scanned source code is published on a publicly available source code repository.

5. The method of claim 4, wherein the scanning occurs periodically subsequent to publishing of source code on the publicly available source code repository.

6. The method of claim 1, wherein the machine learning model is at least one of a: logistic regression model, a neural network, a Random Forest, a support vector machine, or a text classification and representation learning model.

7. The method of claim 1 further comprising:
rendering the modified list of vulnerable tokens into a graphical user interface as a list of entries with corresponding graphical user interface elements; and
receiving user-generated input selecting at least one of the graphical user interfaces to modify at least one entry in the list of vulnerable tokens.

8. The method of claim 1 further comprising at least one of: transmitting the modified list of vulnerable tokens to a remote computing device, providing the modified list of vulnerable tokens to a code scanner scanning the source code, loading the modified list of vulnerable tokens in memory, or storing the modified list of vulnerable tokens in physical persistence.

9. A system comprising:
at least one data processor; and
memory storing instructions which, when executed by the at least one data processor, result in operations comprising:
accessing historical data comprising source code tokens that a rules-based algorithm has identified as vulnerable;
classifying the source code tokens in the historical data as vulnerable or safe;
forming a false positive training dataset including source code tokens from the historical data that have been classified as safe;
training a machine learning model using the false positive training dataset;
scanning source code to generate a list of vulnerable tokens;
inputting, the list of vulnerable tokens, into the machine learning model to identify false positives in the list of vulnerable tokens;
modifying the list of vulnerable tokens to remove the identified false positives; and
causing modification of at least one of the vulnerable tokens, from the modified list of vulnerable tokens, in the source code thereby reducing false positives in identification of source code tokens.

10. The system of claim 9, wherein the scanning occurs prior to uploading of the source code to a source code repository.

11. The system of claim 9, wherein the scanning occurs prior to publishing of the source code on a source code repository.

12. The system of claim 9, wherein the scanned source code is published on a publicly available source code repository.

13. The system of claim 12, wherein the scanning occurs periodically subsequent to publishing of source code on the publicly available source code repository.

14. The system of claim 9, wherein the machine learning model is at least one of a: logistic regression model, a neural network, a Random Forest, a support vector machine, or a text classification and representation learning model.

15. The system of claim 9, wherein the operations further comprise:
rendering the modified list of vulnerable tokens into a graphical user interface as a list of entries with corresponding graphical user interface elements; and
receiving user-generated input selecting at least one of the graphical user interfaces to modify at least one entry in the list of vulnerable tokens.

16. The system of claim 9, wherein the operations further comprise at least one of: transmitting the modified list of vulnerable tokens to a remote computing device, providing the modified list of vulnerable tokens to a code scanner scanning the source code, loading the modified list of vulnerable tokens in memory, or storing the modified list of vulnerable tokens in physical persistence.

17. A non-transitory computer program product storing instructions which, when executed by at least one computing device, result in operations comprising:
accessing historical data comprising source code tokens that a rules-based algorithm has identified as vulnerable;
classifying the source code tokens in the historical data as vulnerable or safe;
forming a false positive training dataset including source code tokens from the historical data that have been classified as safe;

training a machine learning model using the false positive training dataset;

scanning source code to generate a list of vulnerable tokens;

inputting, the list of vulnerable tokens, into the machine learning model to identify false positives in the list of vulnerable tokens;

modifying the list of vulnerable tokens to remove the identified false positives; and causing modification of at least one of the vulnerable tokens, from the modified list of vulnerable tokens, in the source code thereby reducing false positives in identification of source code tokens.

18. The computer program product of claim 17, wherein the scanning occurs at least one of: prior to uploading of the source code to a source code repository or prior to publishing of the source code on a source code repository.

19. The computer program product of claim 17, wherein:
the scanned source code is published on a publicly available source code repository; and
the scanning occurs periodically subsequent to publishing of source code on the publicly available source code repository.

20. The computer program product of claim 19, wherein:
the machine learning model is at least one of a: logistic regression model, a neural network, a Random Forest, a support vector machine, or a text classification and representation learning model; and the operations further comprise:

rendering the modified list of vulnerable tokens into a graphical user interface as a list of entries with corresponding graphical user interface elements; and receiving user-generated input selecting at least one of the graphical user interfaces to modify at least one entry in the list of vulnerable tokens.

* * * * *